US008659684B2

(12) United States Patent
Fukutomi

(10) Patent No.: US 8,659,684 B2
(45) Date of Patent: Feb. 25, 2014

(54) IMAGE PROCESSING APPARATUS, PROGRAM, METHOD AND IMAGE CAPTURING SYSTEM

(75) Inventor: Takeshi Fukutomi, Tokyo (JP)

(73) Assignee: Olympus Corporation, Tokyo (JP)

( * ) Notice: Subject to any disclaimer, the term of this patent is extended or adjusted under 35 U.S.C. 154(b) by 718 days.

(21) Appl. No.: 12/697,442

(22) Filed: Feb. 1, 2010

(65) Prior Publication Data

US 2010/0194934 A1 Aug. 5, 2010

(30) Foreign Application Priority Data

Feb. 3, 2009 (JP) ................................. 2009-022886

(51) Int. Cl.
*H04N 5/228* (2006.01)
*H04N 5/217* (2011.01)
*H04N 9/64* (2006.01)

(52) U.S. Cl.
USPC .......................... 348/242; 348/222.1; 348/241

(58) Field of Classification Search
USPC .............................................. 348/222.1–256
See application file for complete search history.

(56) References Cited

U.S. PATENT DOCUMENTS

| 8,294,805 | B2 * | 10/2012 | Kita ........................ 348/333.02 |
| 2004/0207734 | A1 * | 10/2004 | Horiuchi .................... 348/229.1 |
| 2005/0280868 | A1 * | 12/2005 | Kamon et al. ............... 358/3.01 |
| 2007/0132858 | A1 * | 6/2007 | Chiba et al. ................ 348/222.1 |
| 2009/0141149 | A1 * | 6/2009 | Zhang et al. ................. 348/241 |

FOREIGN PATENT DOCUMENTS

| JP | 3465226 B2 | 4/2001 |
| JP | 2008-199448 A | 8/2008 |
| JP | 2008-293424 A | 12/2008 |

OTHER PUBLICATIONS

Japanese Office Action dated Oct. 9, 2012 issued in counterpart Japanese Application No. 2009-022886.

* cited by examiner

*Primary Examiner* — Timothy J Henn
*Assistant Examiner* — Pritham Prabhakher
(74) *Attorney, Agent, or Firm* — Holtz, Holtz, Goodman & Chick

(57) ABSTRACT

An image processing apparatus with extended dynamic range includes a first gradation-conversion-characteristics calculating unit that calculates first gradation conversion characteristics for each of a plurality of areas of input image signals; and a gradation conversion unit that performs gradation conversion on each of the areas of the image signals by using the first gradation conversion characteristics. A filter processing and reduction processing unit generates a plurality of band signals having mutually different frequency bands by multiresolution conversion processing from the image signals subjected to the gradation conversion. A second gradation-conversion-characteristics calculating unit calculates second gradation conversion characteristics associated with the individual band signals from the first gradation conversion characteristics An NR processing unit performs processing for noise reduction on the individual band signals by using the second gradation conversion characteristics; and an adding unit combines the band signals subjected to the processing for noise reduction.

5 Claims, 3 Drawing Sheets

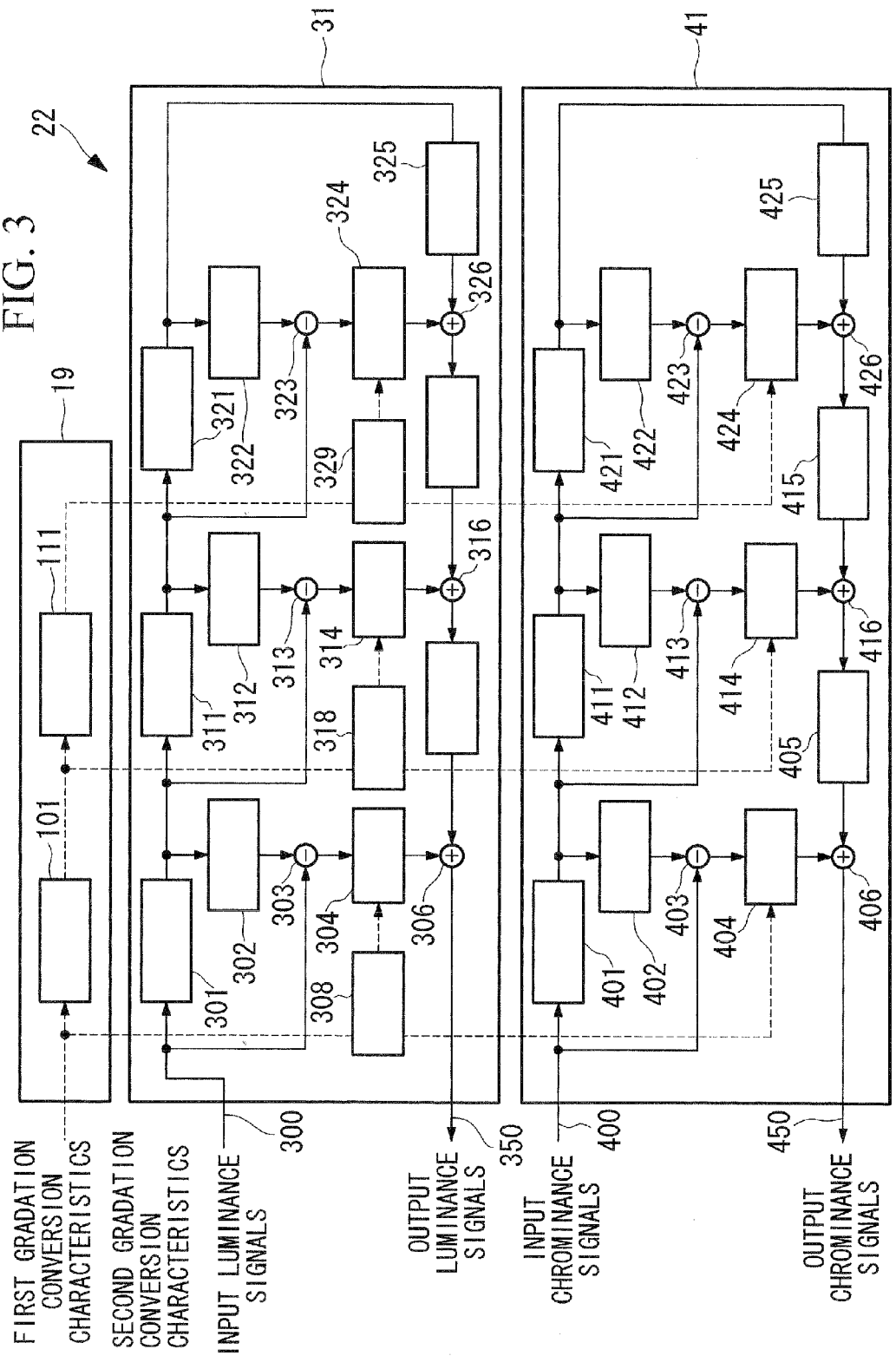

IMAGE PROCESSING APPARATUS, PROGRAM, METHOD AND IMAGE CAPTURING SYSTEM

BACKGROUND OF THE INVENTION

1. Field of the Invention

The present invention relates to an image processing apparatus, a program, a method, and an image capturing system that perform processing for noise reduction on input image signals.

This application is based on Japanese Patent Application No. 2009-022886, the content of which is incorporated herein by reference.

2. Description of Related Art

There has hitherto been known what is called space-variant gradation conversion processing, in which in order to increase the dynamic range of an image scene, gradation conversion processing is performed while varying the gradation conversion characteristics for each area of the image scene (e.g., see the Publication of Japanese Patent No. 3465226).

By performing the space-variant gradation conversion processing described above, the effect of brightening dark areas of the image scene is achieved.

BRIEF SUMMARY OF THE INVENTION

The present invention provides an image processing apparatus, a program, a method, and an image capturing system with which it is possible to extend the dynamic range by performing gradation conversion processing and to effectively reduce noise in image signals subjected to the gradation conversion processing.

A first aspect of the present invention is an image processing apparatus including a first gradation-conversion-characteristics calculating unit that calculates gradation conversion characteristics for each of a plurality of areas of input image signals; a gradation conversion unit that performs gradation conversion on each of the areas of the image signals by using the first gradation conversion characteristics calculated by the first gradation-conversion-characteristics calculating unit; a band-signal generating unit that generates a plurality of band signals having mutually different frequency bands by multi-resolution conversion processing from the image signals subjected to the gradation conversion by the gradation conversion unit; a second gradation-conversion-characteristics calculating unit that calculates second gradation conversion characteristics associated with the individual band signals generated by the band-signal generating unit from the first gradation conversion characteristics calculated by the first gradation-conversion-characteristics calculating unit; a noise reducing unit that performs processing for noise reduction on the individual band signals by using the second gradation conversion characteristics calculated by the second gradation-conversion-characteristics calculating unit; and an image combining unit that combines the band signals subjected to the processing for noise reduction by the noise reducing unit.

"Area" includes an area containing only a single pixel as well as an area containing a plurality of pixels.

According to the above aspect, upon input of image signals, the first gradation-conversion-characteristics calculating unit calculates first gradation conversion characteristics suitable for each area of the image signals, and the gradation conversion unit performs gradation conversion processing on each area. The image signals subjected to the gradation conversion processing are divided into a plurality of band signals by the band-signal generating unit, and the second gradation-conversion-characteristics calculating unit calculates second gradation conversion characteristics associated with the individual band signals. The noise reducing unit performs processing for noise reduction on the individual band signals by using the second gradation conversion characteristics, and the plurality of band signals subjected to the processing for noise reduction are combined by the image combining unit.

Accordingly, since it is possible to perform processing for noise reduction on individual band signals on the basis of the second gradation conversion characteristics calculated for the individual band signals, it is possible to effectively reduce noise in the image signals subjected to the gradation conversion processing.

A second aspect of the present invention is an image capturing system including an image capturing unit that captures an image of an object; and the above-described image processing apparatus that processes image signals acquired by the image capturing unit.

A third aspect of the present invention is a recording medium having recorded thereon an image processing program for causing a computer to execute first gradation-conversion-characteristics calculation processing for calculating first gradation conversion characteristics for each of a plurality of areas of input image signals; gradation conversion processing for performing gradation conversion on each of the areas of the image signals by using the first gradation conversion characteristics calculated in the first gradation-conversion-characteristics calculation processing; band-signal generation processing for generating a plurality of band signals having mutually different frequency bands by multi-resolution conversion processing from the image signals subjected to the gradation conversion in the gradation conversion processing; second gradation-conversion-characteristics calculation processing for calculating second gradation conversion characteristics associated with the individual band signals generated in the band-signal generation processing from the first gradation conversion characteristics calculated in the first gradation-conversion-characteristics calculation processing; noise reduction processing for performing processing for noise reduction on the individual band signals by using the second gradation conversion characteristics calculated in the second gradation-conversion-characteristics calculation processing; and image combination processing for combining the plurality of band signals subjected to the processing for noise reduction in the noise reduction processing.

A fourth aspect of the present invention is an image processing method comprising a first gradation-conversion-characteristics calculating step of calculating first gradation conversion characteristics for each of a plurality of areas of input image signals; a gradation conversion step of performing gradation conversion on each of the areas of the image signals by using the first gradation conversion characteristics calculated in the first gradation-conversion-characteristics calculating step; a band-signal generating step of generating a plurality of band signals having mutually different frequency bands by multi-resolution conversion processing from the image signals subjected to the gradation conversion in the gradation conversion step; a second gradation-conversion-characteristics calculating step of calculating second gradation conversion characteristics associated with the individual band signals generated in the band-signal generating step from the first gradation conversion characteristics calculated in the first gradation-conversion-characteristics calculating step; a noise reducing step of performing processing for noise reduction on the individual band signals by using the second gradation conversion characteristics calculated in the second gradation-conversion-characteristics calculating step; and an image combining step of combining the plurality of band signals subjected to the processing for noise reduction in the noise reducing step.

BRIEF DESCRIPTION OF THE SEVERAL VIEWS OF THE DRAWINGS

FIG. 3 is a functional block diagram of a noise reducing unit according to a second embodiment.

DETAILED DESCRIPTION OF THE INVENTION

[First Embodiment]

Hereinafter, an image processing apparatus and an image capturing system according to a first embodiment of the present invention will be described with reference to the drawings. Here, description will be given in the context of an example where an image processing apparatus according to the present invention is applied to an image capturing system.

Figure 1:
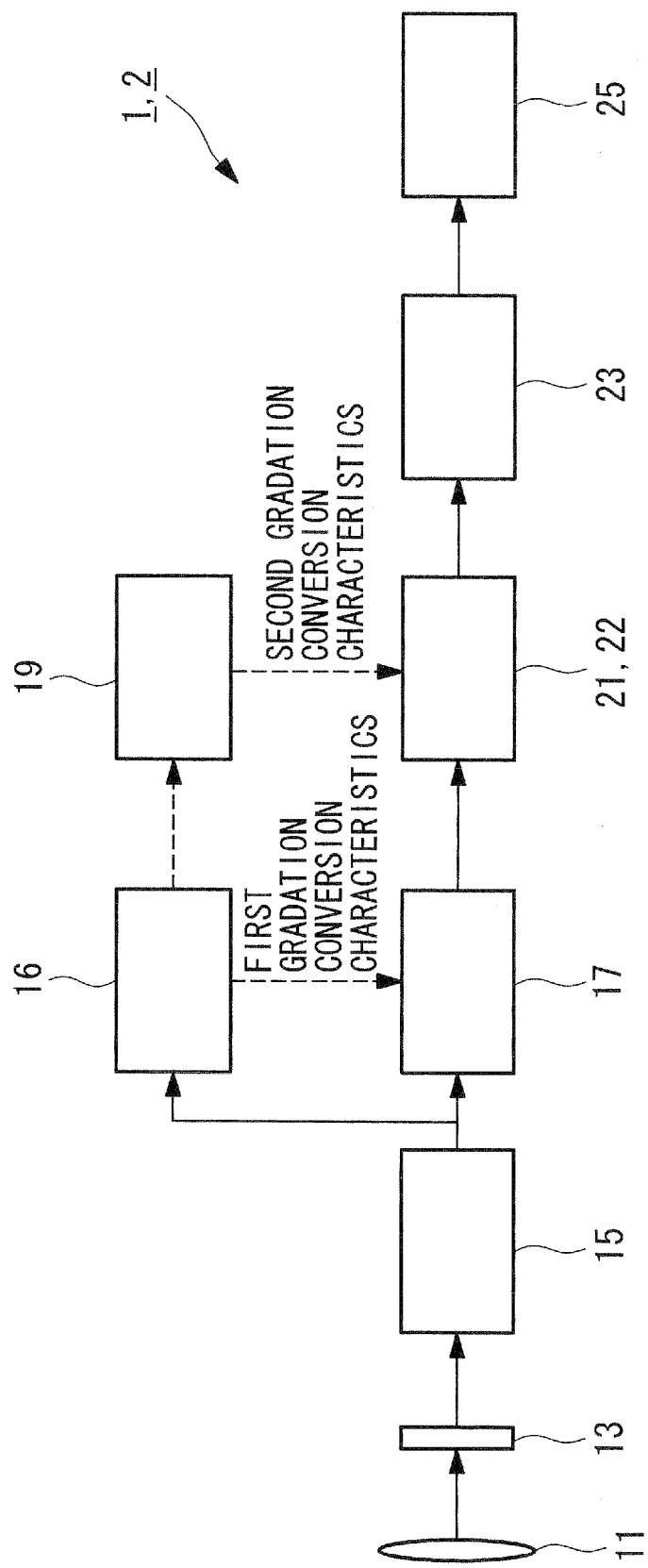
FIG. 1 is a block diagram schematically showing the configuration of image capturing systems according to embodiments of the present invention.

FIG. 1 is a block diagram schematically showing the configuration of an image capturing system 1 including an image processing apparatus according to this embodiment. As shown in FIG. 1, the image capturing system 1 includes an optical block 11, such as a lens, an image capturing block (image capturing unit) 13, such as a CCD, that acquires an image of an object formed by the optical block 11 in the form of image signals, an image processing unit 15 that processes the image signals acquired by the image capturing block 13, a first gradation-conversion-characteristics calculating unit 16 that calculates space-variant first gradation conversion characteristics from the image signals processed by the image processing unit 15, a gradation conversion unit 17 that performs space-variant gradation conversion processing on the image signals processed by the image processing unit 15, by using the first gradation conversion characteristics calculated by the first gradation-conversion-characteristics calculating unit 16, a second gradation-conversion-characteristics calculating unit 19 that calculates second gradation conversion characteristics from the first gradation conversion characteristics calculated by the gradation-conversion-characteristics calculating unit 16, a noise reducing unit 21 that performs processing for noise reduction on the image signals subjected to the gradation conversion processing by the gradation conversion unit 17, by using the second gradation conversion characteristics calculated by the second gradation-conversion-characteristics calculating unit 19, an image compressing unit 23 that compresses the image signals subjected to the processing for noise reduction by the noise reducing unit 21, and a recording medium 25 for recording thereon the image signals compressed by the image compressing unit 23.

The operation of the image capturing system 1 configured as described above will be described below.

An image of an object formed on the surface of the image capturing block 13 by the optical block 11 is converted into electrical signals by the image capturing block 13, and CDS (Correlated Double Sampling)/differential sampling, adjustment of the analog gain, etc. are performed. Then, the result is converted into digital signals by an A/D conversion unit (not shown), and the image processing unit 15 performs various types of processing for improving the image quality, such as γ correction, color separation, and chrominance matrix correction. The image signals processed by the image processing unit 15 are output to the first gradation-conversion-characteristics calculating unit 16 and the gradation conversion unit 17.

In the first gradation-conversion-characteristics calculating unit 16, first gradation conversion characteristics are calculated by using the image signals processed by the image processing unit 15, and the first gradation conversion characteristics are output to the gradation conversion unit 17 and the second gradation-conversion-characteristics calculating unit 19. Here, the first gradation conversion characteristics are obtained by dividing the pixel values of the image signals after the gradation conversion processing by the pixel values of the image signals before the gradation conversion processing, and represent the amplification factors of the individual pixel values.

In the gradation conversion unit 17, space-variant gradation conversion processing is performed on the image signals processed by the image processing unit 15, by using the first gradation conversion characteristics calculated by the first gradation-conversion-characteristics calculating unit 16. The image signals subjected to the gradation conversion processing by the gradation conversion unit 17 are output to the noise reducing unit 21.

In the noise reducing unit 21, processing for noise reduction is performed on the image signals subjected to the gradation conversion processing by the gradation conversion unit 17. The processing for noise reduction will be described later in detail. The image signals subjected to the processing for noise reduction by the noise reducing unit 21 are output to the image compressing unit 23, compressed by the image compressing unit 23, and recorded on the recording medium 25.

Hereinafter, the processing for noise reduction will be described in detail by using FIG. 2.

Figure 2:
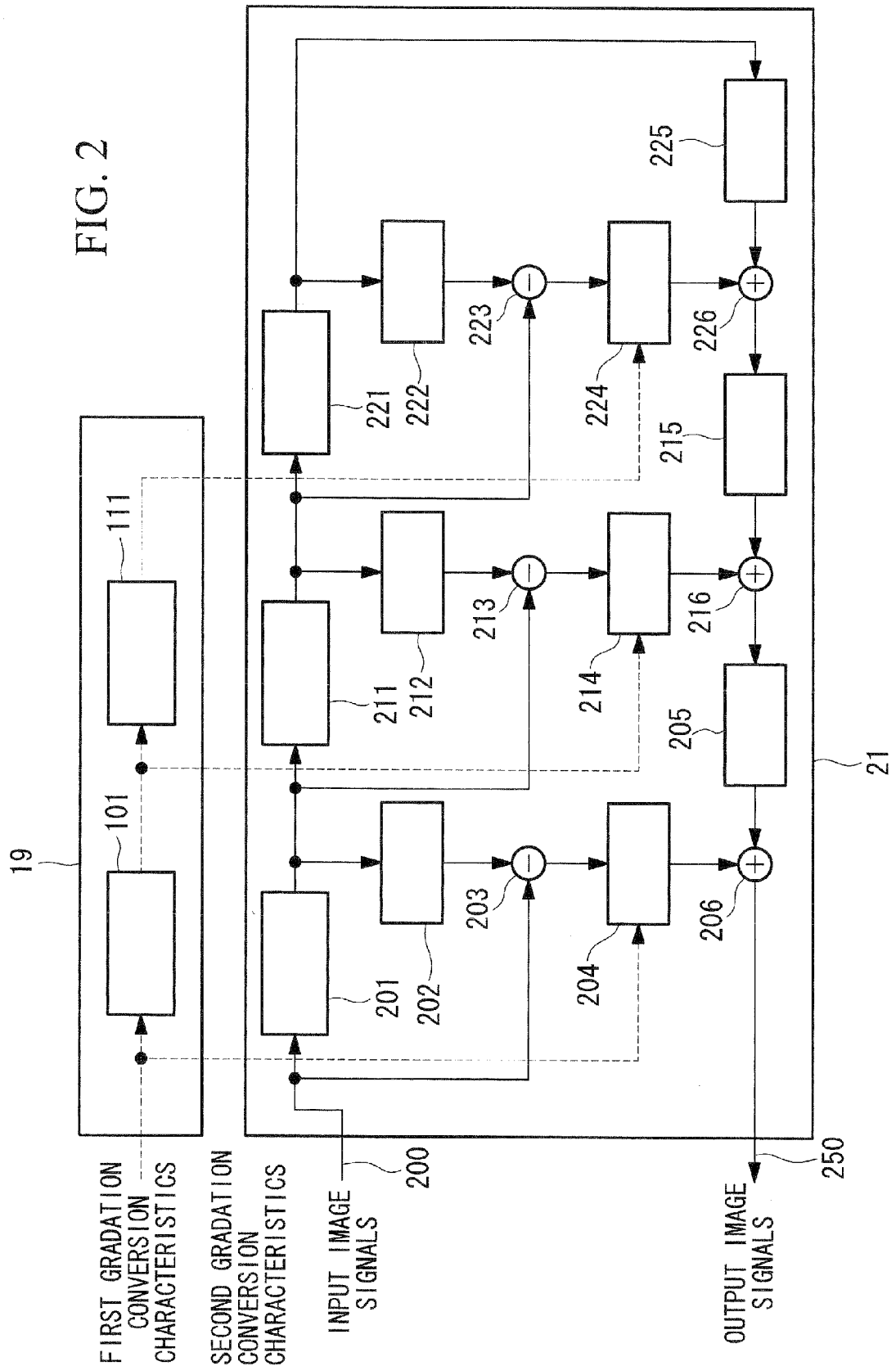
FIG. 2 is a functional block diagram of a noise reducing unit according to first embodiment.

FIG. 2 is a block diagram showing detailed functions of the second gradation-conversion-characteristics calculating unit 19 and the noise reducing unit 21. As shown in FIG. 2, the second gradation-conversion-characteristics calculating unit 19 includes N−1 (N is an integer greater than or equal to 1) stages of filter processing and reduction processing units 101 and 111. This embodiment will be described in the context of an example where N=3.

In the second gradation-conversion-characteristics calculating unit 19, the first gradation conversion characteristics calculated by the first gradation-conversion-characteristics calculating unit 16 are subjected to low-pass filter processing and then reduced in the filter processing and reduction processing unit 101 at the first stage. Through this processing, the size of the first gradation conversion characteristics is reduced to, for example, half both in the horizontal direction and the vertical direction. The reduced first gradation conversion characteristics are supplied to the filter processing and reduction processing unit 111 at the second stage and further reduced. That the filter processing and reduction processing units 101 and 111 reduce the gradation conversion characteristics supplied from the filter processing and reduction processing units at the previous stages (the first gradation-conversion-characteristics calculating unit 16 in the case of the filter processing and reduction processing unit 101) to the same sizes as the associated band signals.

Now, the processing for reducing the gradation conversion characteristics will be described.

In multi-resolution conversion processing, images of different resolutions (sizes) are generated for individual bands. Since the gradation conversion characteristics are amplification factors of the pixel values of individual pixels, the gradation conversion characteristics have the same size as an image. In order to apply the gradation conversion characteristics to an image of a certain band, the gradation conversion characteristics have to be converted into the same size as the image of that band. As the size conversion method, an arbitrary resizing method, such as the nearest neighbor method, is used. With the image and the gradation conversion characteristics of each band having the same size, it is possible to perform processing on each corresponding pair of pixels.

The noise reducing unit 21 is configured to perform multi-resolution conversion by a Laplacian pyramid, and it includes N stages of filter processing and reduction processing units 201, 211, and 221, and also includes enlargement processing units 202, 212, and 222, subtracting units (band-signal generating units) 203, 213, and 223, NR processing units (noise reducing units) 204, 214, and 224, enlargement processing units 205, 215, and 225, and adding units (image combining units) 206, 216, and 226, provided respectively in association with the filter processing and reduction processing units 201, 211, and 221. As described earlier, N is an integer greater than or equal to 1, and description will be given here in the context of an example where N=3.

First, processing for dividing input image signals 200 into a plurality of band signals and reducing noise in the individual band signals will be described.

The filter processing and reduction processing unit 201 at the first stage performs low-pass filter processing on the input image signals 200 and then reduces the result to a predetermined size. Thus, the image size of the input image signals 200 is reduced to, for example, half both in the horizontal direction and the vertical direction. The reduced image generated by the filter processing and reduction processing unit 201 is supplied to the enlargement processing unit 202 and the filter processing and reduction processing unit 211 at the subsequent stage.

The enlargement processing unit 202 enlarges the reduced image supplied from the filter processing and reduction before the reduction processing by the filter processing and reduction processing unit 201. That is, here, the reduced image is enlarged to the size of the input image signals 200, and the result is output to the subtracting unit 203. The subtracting unit 203 calculates difference signals between the image signals input from the enlargement processing unit 202 and the image signals input to the filter processing and reduction processing unit 201, i.e., the input image signals 200, thereby generating band signals, and outputs the band signals to the NR processing unit 204. Furthermore, the NR processing unit 204 receives the associated second gradation conversion characteristics, i.e., the gradation conversion characteristics input to the filter processing and reduction processing unit 101 at the first stage, as second gradation conversion characteristics from the second gradation-conversion-characteristics calculating unit 19. The NR processing unit 204 performs predetermined noise reduction processing on the input band signals by using the second gradation conversion characteristics and outputs the result to the adding unit 206.

Here, as a specific method of noise reduction processing, for example, coring processing is conceivable. Coring processing is processing in which input signals with absolute values less than or equal to a threshold are all changed to zero, whereas input signals with absolute values greater than the threshold are changed to signals obtained by decreasing the absolute values by the threshold. That the NR processing unit 204 multiplies space-variant second gradation conversion characteristics by a preset threshold and performs the coring processing described above, thereby performing processing for noise reduction on the band signals input from the subtracting unit 203.

At the second stage and the third stage, processing similar to the processing in the first stage is performed on image signals output from the filter processing and reduction processing unit at the previous stage. That is, at the second stage and the third stage, band signals are generated from image signals output from the filter processing and reduction processing units 201 and 211, respectively, and processing for noise reduction is performed on the generated band signals by using the associated second gradation conversion characteristics. The band signals subjected to the processing for noise reduction as described above are output to the adding units 216 and 226.

Next, processing for combining the band signals subjected to the processing for noise reduction and outputting the result as output image signals 250 will be described.

The enlargement processing unit 225 at the third stage performs enlargement processing on the reduced image from the filter processing and reduction processing unit 221 and outputs the result to the adding unit 226. The adding unit 226 adds together the noise-reduced band signals supplied from the NR processing unit 224 and the reduced image supplied from the enlargement processing unit 225 and outputs the result to the enlargement processing unit 215.

At the second stage and the first stage, processing similar to the processing described above is performed, so that the adding units 216 and 206 add together the noise-reduced band signals supplied from the NR processing units and the reduced images supplied from the enlargement processing units at the subsequent stages and output the results to the enlargement processing units at the previous stages (the image compressing unit 23 in the case of the adding unit 206). In this way, noise-reduced band signals are recombined sequentially from the low-frequency side, and noise-reduced output image signals 250 finally resized back to the predetermined size are output from the adding unit 206.

As described above, with the image capturing system 1 according to this embodiment, regarding a plurality of areas in image signals acquired by the image capturing block 13, the first gradation-conversion-characteristics calculating unit 16 calculates first gradation conversion characteristics suitable for each of the areas, and the gradation conversion unit 17 performs gradation conversion processing on each of the areas. The image signals subjected to the gradation conversion processing are divided into a plurality of band signals by the filter processing and reduction processing units 201, 211, and 221, and the second gradation-conversion-characteristics calculating unit 19 calculates second gradation conversion characteristics associated with the individual band signals. The NR processing units 204, 214, and 224 perform processing for noise reduction on the individual band signals by using the second gradation conversion characteristics, and the plurality of band signals subjected to the processing for noise reduction are combined by the adding units 206, 216, and 226.

Accordingly, since it is possible to perform processing for noise reduction on individual band signals on the basis of second gradation conversion characteristics calculated for the individual band signals, it is possible to effectively reduce noise in image signals subjected to gradation conversion processing.

[Second Embodiment]

Next, a second embodiment of the present invention will be described by using FIG. 3.

An image capturing system 2 according to this embodiment differs from the first embodiment in that image signals are separated into luminance signals and chrominance signals and processing for noise reduction is performed on the individual signals. Hereinafter, regarding the image capturing system 2 according to this embodiment, a description of commonalities with the first embodiment will be omitted, and differences will be mainly described.

As shown in FIG. 3, instead of the noise reducing unit 21 shown in FIG. 1, the image capturing system 2 includes an image-signal separating unit (not shown) that separates input image signals into luminance signals and chrominance signals, a luminance-signal noise reducing unit 31 that performs processing for noise reduction on the luminance signals, and a chrominance-signal noise reducing unit 41 that performs processing for noise reduction on the chrominance signals.

The luminance-signal noise reducing unit 31 is configured to perform multi-resolution conversion by a Laplacian pyramid, and it includes N stages of filter processing and reduction processing units 301, 311, and 321, and also includes enlargement processing units 302, 312, and 322, subtracting units 303, 313, and 323, correcting units 308, 318, and 328, NR processing units 304, 314, and 324, enlargement processing units 305, 315, and 325, and adding units 306, 316, and 326, provided respectively in association with the individual filter processing and reduction processing units 301, 311, and 321.

The chrominance-signal noise reducing unit 41 is configured to perform multi-resolution conversion by a Laplacian pyramid, and it includes N stages of filter processing and reduction processing units 401, 411, and 421, and also includes enlargement processing units 402, 412, and 422, subtracting units 403, 413, and 423, NR processing units 404, 414, and 424, enlargement processing units 405, 415, and 425, and adding units 406, 416, and 426, provided respectively in association with the individual filter processing and reduction processing units 401, 411, and 421.

N is an integer greater than or equal to 1, and description will be given here in the context of an example where N=3.

The correcting units 308, 318, and 328 correct second gradation conversion characteristics for input luminance signals 300 and input chrominance signals 400 individually as second gradation conversion characteristics for luminance signals and for chrominance signals and output the corrected second gradation conversion characteristics to the NR processing units 304, 314, and 324 of the luminance-signal noise reducing unit 31 and the NR processing units 404, 414, and 424 of the chrominance-signal noise reducing unit 41. In other components of the luminance-signal noise reducing unit 31 and the chrominance-signal noise reducing unit 41, processing similar to the processing in the first embodiment described earlier is performed on the luminance signals or the chrominance signals.

The operation of the thus-configured image capturing system 2 will be described below.

Image signals acquired by the image capturing block 13 are separated into luminance signals and chrominance signals by the image-signal separating unit. The luminance signals and chrominance signals are individually subjected to filter processing and reduction processing, enlargement processing, and subtraction processing in individual bands, similarly to the first embodiment described earlier.

Space-variant second gradation conversion characteristics are corrected in individual bands by the correcting units 308, 318, and 328 into gradation conversion characteristics for luminance signals and gradation conversion characteristics for chrominance signals. As a specific correcting method, for example, correction is performed by using equation (1) below, where G denotes gradation conversion characteristics at an arbitrary pixel before correction, G' denotes corrected gradation conversion characteristics, and α (0≤α) denotes a correcting parameter.

$$G'=\alpha*G+1-\alpha \quad (1)$$

Here, when the corrected gradation conversion characteristic G' is a value greater than 1, noise reduction processing is performed aggressively. By making it possible to adjust α, thereby setting different values as gradation conversion characteristics for luminance signals and chrominance signals, setting is possible such that a large value is chosen as gradation conversion characteristics for luminance signals in order to remove luminance noise aggressively, whereas a small value is chosen as gradation conversion characteristics for chrominance signals in order to maintain chroma in noise-reduced image signals.

Furthermore, when G is a value greater than 1, the value of G' approaches 1 as a approaches 0, and the degree of noise reduction is weakened.

The thus-corrected gradation conversion characteristics for luminance signals and chrominance signals are input to the NR processing units 304, 314, and 324 of the luminance-signal noise reducing unit 31 and the NR processing units 404, 414, and 424 of the chrominance-signal noise reducing unit 41, and the NR processing units perform processing similar to the processing in the first embodiment described earlier on the luminance signals and chrominance signals Then, the luminance signals and chrominance signals in individual bands are subjected to enlargement processing and adding processing, and the results are output as noise-reduced output luminance signals 350 and output chrominance signals 450 resized back to the predetermined size.

As described above, with the image capturing system 2 according to this embodiment, it is possible to separate input image signals into luminance signals and chrominance signals by an image-signal separating unit, correct space-variant second gradation conversion characteristics individually for the luminance signals and the chrominance signals, and perform processing for noise reduction on the luminance signals and chrominance signals in individual hands by using the corrected gradation conversion characteristics. Accordingly, it is possible to perform noise reduction processing adaptively on luminance noise and chrominance noise included in luminance signals and chrominance signals.

Although it has been described that the correcting units 308, 318, and 328 correct second gradation conversion characteristics for luminance signals and for chrominance signals in this embodiment, it is possible to correct second gradation conversion characteristics for either luminance signals or chrominance signals alone.

Furthermore, although it has been described that image signals subjected to gradation conversion by the gradation conversion unit 17 are separated into luminance signals and chrominance signals and a plurality of band signals are generated individually for the luminance signals and the chrominance signals in this embodiment, alternatively, it is possible to generate a plurality of band signals subjected to gradation conversion and separate the band signals into luminance signals and chrominance signals.

Although the embodiments of the present invention have been described above in detail with reference to the drawings, specific configurations are not limited to the embodiments, and design modifications or the like not departing from the spirit of the present invention are encompassed.

For example, the embodiments described above are examples of applying image processing apparatuses according to the present invention to image capturing systems. Specific image capturing systems may be products such as floor-type cameras for broadcasting, ENG cameras, consumer handy cameras, or digital cameras, image-signal correcting programs (CG programs) that deal with moving pictures, or image editing apparatuses.

Furthermore, although processing by hardware is assumed with an image processing apparatus in the embodiments described above, limitation to such a configuration is not necessary. For example, a configuration in which processing is performed by separate software is possible. In this case, an image processing apparatus has a CPU, a main storage device such as a RAM, and a computer-readable recording medium having recorded thereon a program for implementing the entirety or part of the processing described above. The CPU reads out the program recorded on the storage medium and executes information manipulation and calculation processing, whereby processing similar to the processing by the image processing apparatuses described above is implemented. Here, the computer-readable recording medium refers to a magnetic disk, a magneto-optical disk, a CD-ROM, a DVD-ROM, a semiconductor memory, or the like.

Furthermore, although coring processing has been described as an example of the method of processing for noise reduction, the method is not limited as long as it is possible to vary the degree of noise reduction processing on the basis of space-variant second gradation conversion characteristics.

Furthermore, although it has been described that first gradation conversion characteristics are reduced after low-pass filter processing by the filter processing and reduction processing units of the first gradation-conversion-characteristics calculating unit 16, it is possible to perform only reduction processing.

Furthermore, although it has been described that the second gradation-conversion-characteristics calculating unit 19 calculates second gradation conversion characteristics associated with the individual band signals, the second gradation-conversion-characteristics calculating unit 19 may calculate second gradation conversion characteristics associated with some of the band signals.

Furthermore, although it has been described that NR processing units perform processing for noise reduction on Individual hand signals by using the second gradation conversion characteristics, processing for noise reduction may be performed only on some of the band signals by using the second gradation conversion characteristics.

What is claimed is:

1. An image processing apparatus comprising:
a first gradation-conversion-characteristics calculating unit that calculates first gradation conversion characteristics for each of a plurality of areas of input image signals, each of the plurality of areas of the input image signals including at least one pixel, and the first gradation conversion characteristics being obtained by dividing pixel values of the input image signals after gradation conversion processing by pixel values of the input image signals before the gradation conversion processing, wherein the first gradation conversion characteristics represent amplification factors of the pixel values;
a gradation conversion unit that performs gradation conversion on each of the areas of the image signals by using the first gradation conversion characteristics;
a band-signal generating unit that generates a plurality of band signals having mutually different frequency bands by multi-resolution conversion processing from the image signals subjected to the gradation conversion by the gradation conversion unit, sizes of the plurality of band signals being smaller than sizes of the input image signals;
a second gradation-conversion-characteristics calculating unit that calculates second gradation conversion characteristics for each of the areas of the image signals based on the first gradation conversion characteristics, the second gradation conversion characteristics being calculated by making sizes of the first gradation conversion characteristics the same as the sizes of the plurality of band signals, and the second gradation conversion characteristics being a function of each of the plurality of band signals and the amplification factors of the pixel values;
a noise reducing unit that performs processing for noise reduction on each of the plurality of band signals by using the second gradation conversion characteristics calculated by the second gradation-conversion-characteristics calculating unit; and
an image combining unit, that combines the band signals subjected to the processing for noise reduction by the noise reducing unit.

2. An image processing apparatus according to claim 1, further comprising a gradation-conversion-characteristics correcting unit that corrects the second gradation conversion characteristics in accordance with luminance signals and chrominance signals of the individual bands generated by the hand signal generating unit,
wherein the noise reducing unit performs the processing for noise reduction individually on the luminance signals and chrominance signals of the individual bands by using the second gradation conversion characteristics corrected by the gradation-conversion-characteristics correcting unit.

3. An image capturing system comprising:
an image capturing unit that captures an image of an object; and
an image processing apparatus according to claim 1 that processes image signals acquired by the image capturing unit.

4. A non-transitory computer readable recording medium having recorded thereon an image processing program for causing a computer to execute processing comprising:
first gradation-conversion-characteristics calculation processing for calculating first gradation conversion characteristics for each of a plurality of areas of input image signals, the first gradation conversion characteristics being obtained by dividing pixel values of the input image signals after gradation conversion processing by pixel values of the input image signals before the gradation conversion processing, wherein the first gradation conversion characteristics represent amplification factors of the pixel values;
gradation conversion processing for performing gradation conversion on each of the areas of the image signals by using the first gradation conversion characteristics;
band-signal generation processing for generating a plurality of band signals having mutually different frequency bands by multi-resolution conversion processing from the image signals subjected to the gradation conversion in the gradation conversion processing, sizes of the plurality of band signals being smaller than sizes of the input image signals;
second gradation-conversion-characteristics calculation processing for calculating second gradation conversion characteristics for each of the areas of the image signals based on the first gradation conversion characteristics, the second gradation conversion characteristics being calculated by making sizes of the first gradation conversion characteristics the same as the sizes of the plurality of band signals, and the second gradation conversion characteristics being a function of each of the plurality of band signals and the amplification factors of the pixel values;

noise reduction processing for performing processing for noise reduction on each of the plurality of band signals by using the second gradation conversion characteristics calculated in the second gradation-conversion-characteristics calculation processing; and image combination processing for combining the plurality of band signals subjected to the processing for noise reduction in the noise reduction processing.

5. An image processing method comprising:

a first gradation-conversion-characteristics calculating step of calculating first gradation conversion characteristics for each of a plurality of areas of input image signals, the first gradation conversion characteristics being obtained by dividing pixel values of the input image signals after gradation conversion processing by pixel values of the input image signals before the gradation conversion processing, wherein the first gradation conversion characteristics represent amplification factors of the pixel values;

a gradation conversion step of performing gradation conversion on each of the areas of the image signals by using the first gradation conversion characteristics;

a band-signal generating step of generating a plurality of band signals having mutually different frequency bands by multi-resolution conversion processing from the image signals subjected to the gradation conversion in the gradation conversion step, sizes of the plurality of band signals being smaller than sizes of the input image signals;

a second gradation-conversion-characteristics calculating step of calculating second gradation conversion characteristics for each of the areas of the image signals based on the first gradation conversion characteristics, the second gradation conversion characteristics being calculated by making sizes of the first gradation conversion characteristics the same as the sizes of the plurality of band signals, and the second gradation conversion characteristics being a function of each of the plurality of band signals and the amplification factors of the pixel values;

a noise reducing step of performing processing for noise reduction on each of the plurality of band signals by using the second gradation conversion characteristics calculated in the second gradation-conversion-characteristics calculating step; and an image combining step of combining the plurality of band signals subjected to the processing for noise reduction in the noise reducing step.

* * * * *